March 10, 1970 — R. ZIPPEL — 3,499,387
PLASTIC INJECTION MACHINES
Original Filed Feb. 17, 1966 — 5 Sheets-Sheet 1

Inventor:
Richard Zippel
By: Nolte & Nolte
Attorneys

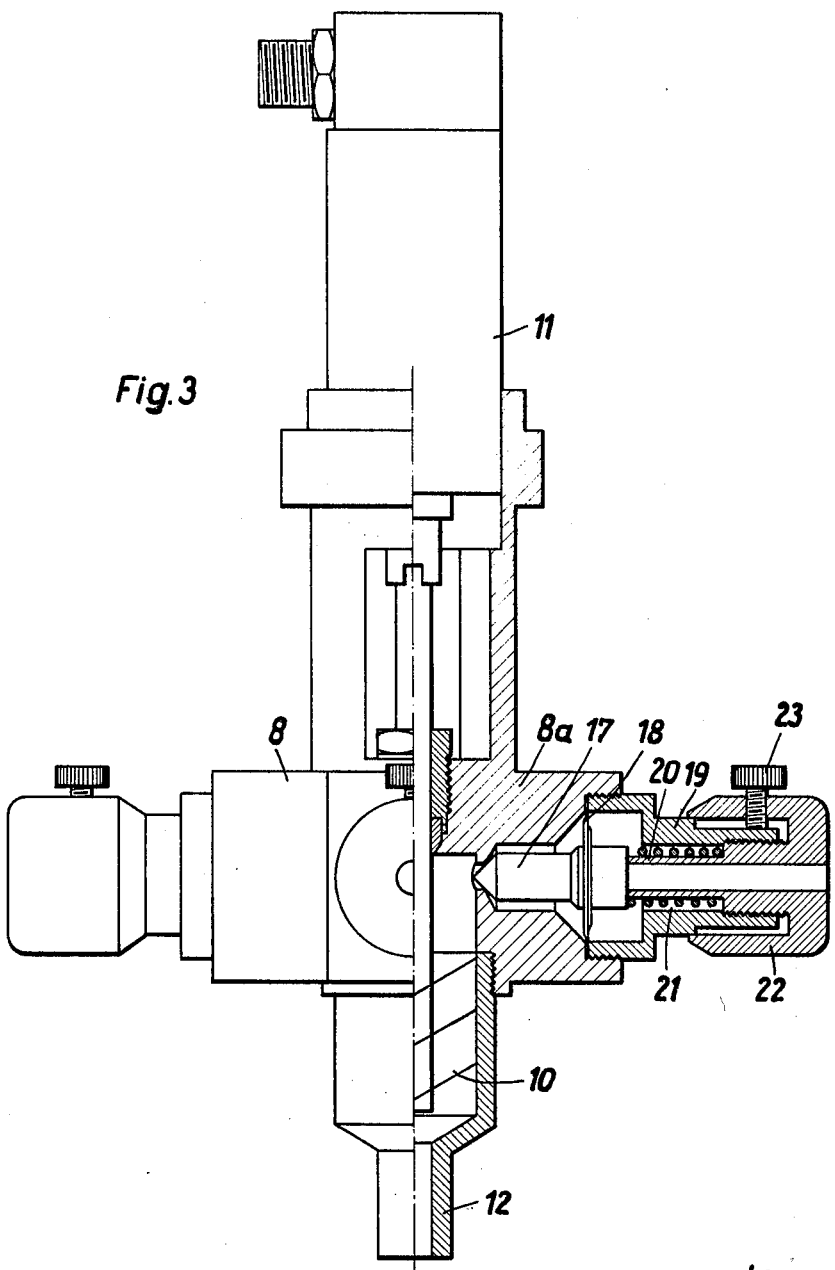

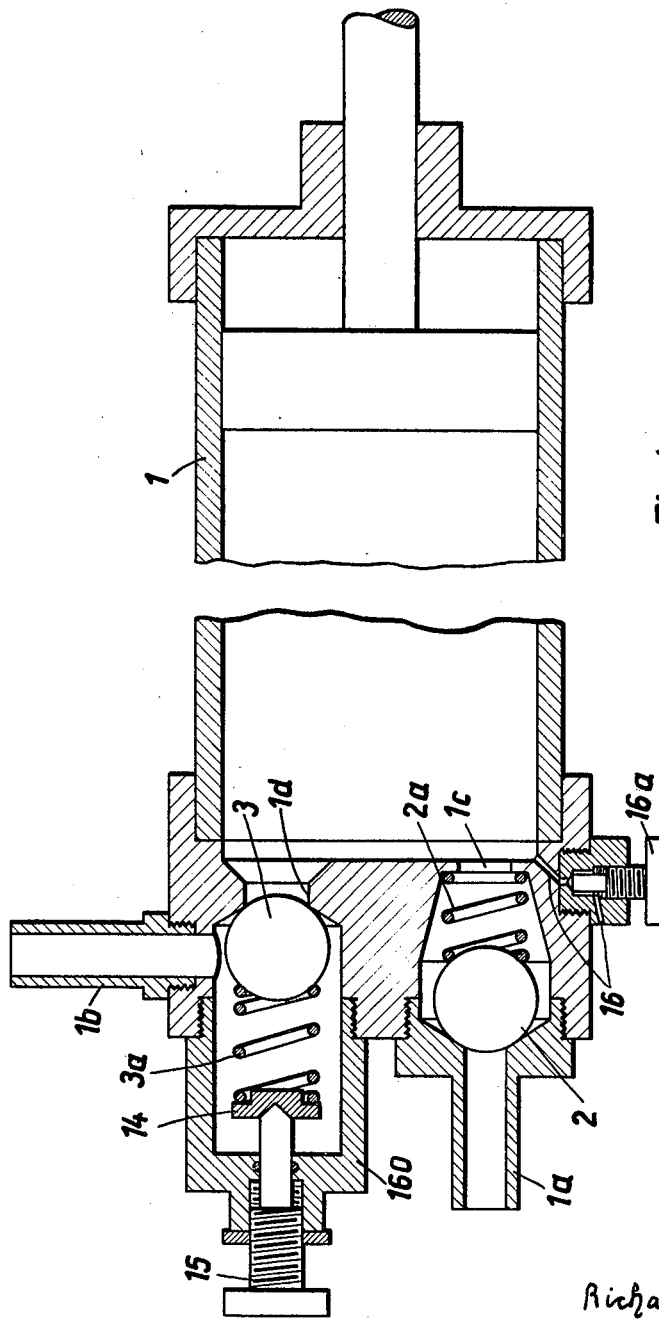

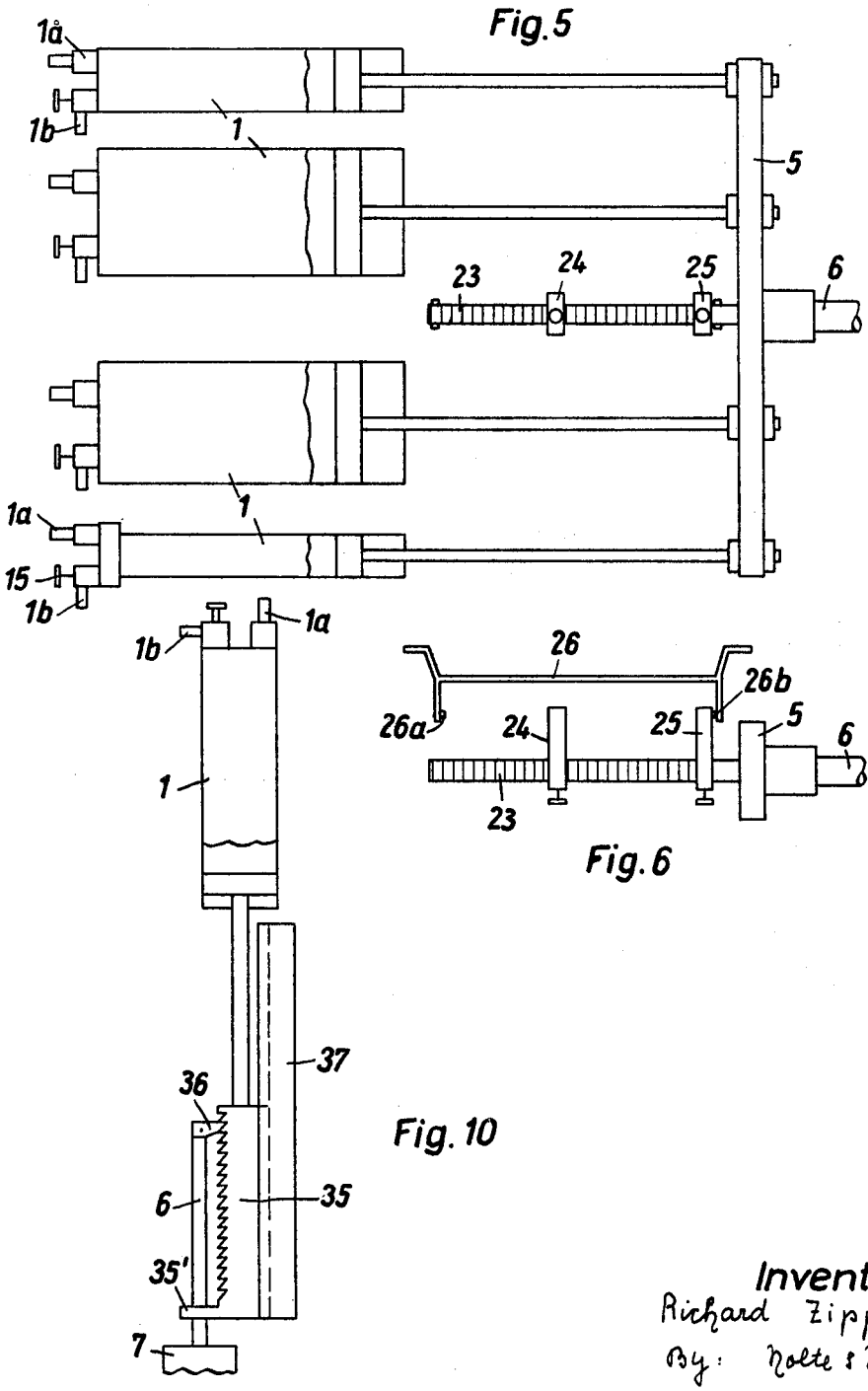

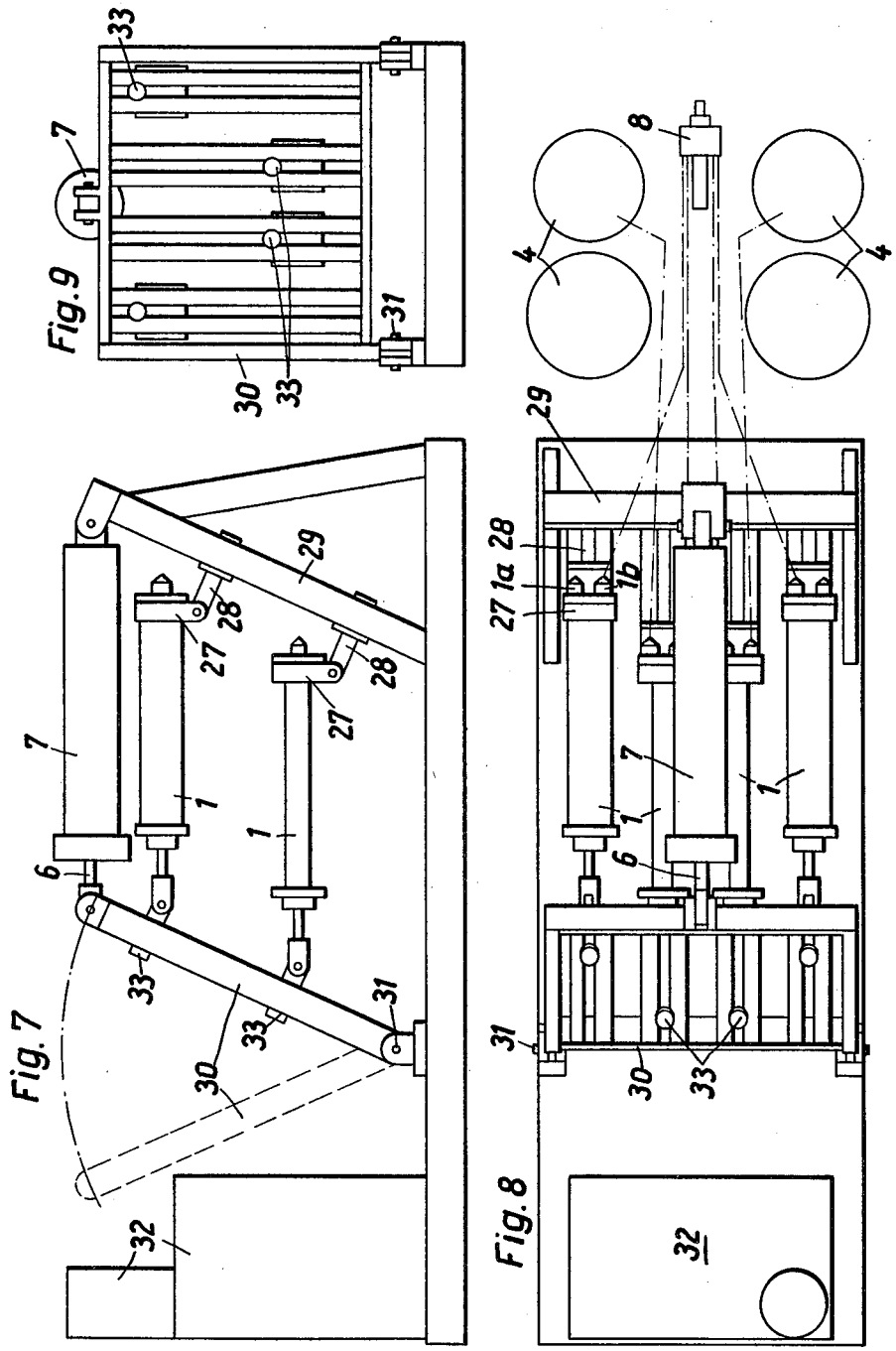

United States Patent Office 3,499,387
Patented Mar. 10, 1970

3,499,387
PLASTIC INJECTION MACHINES
Richard Zippel, 12–17 Bremer Strasse,
344 Eschwege, Germany
Original application Feb. 17, 1966, Ser. No. 528,120.
Divided and this application May 2, 1968, Ser. No. 739,987
Claims priority, application Germany, Feb. 19, 1965, Z 11,347
Int. Cl. F04b *49/08, 17/00;* F04d *15/00*
U.S. Cl. 103—38      2 Claims

ABSTRACT OF THE DISCLOSURE

A plastic injection machine having a plurality of piston pumps for feeding a plurality of plastic material components in the required relative proportions, quantities and through-put rates to a mixing chamber. Non-return valve means associated with each pump to control the discharge of the plastics material therefrom in dependence on the pressure of the same in the pump. Each of the pumps is mounted with one end adjustably connected by a pivoted coupling to a respective guide channel in a pivotable frame, and the other end similarly connected to a fixed frame: the stroke of each pump being determined by the position at which said ends are connected to their respective frames which are connected to a base member. The pumps being actuated by a cylinder-piston arrangement mounted between said frames, at the ends of the frames remote from the base member.

---

This is a division of application Ser. No. 528,120, now abandoned, filed Feb. 17, 1966.

The present invention relates to plastic injection machines for covering objects with plastic material, and for filling cavities with plastic moulding material, by combining in metered amounts a plurality of liquid plastic material components, such as components which react with one another to form a plastic foam material.

An object of the present invention is to provide a novel and improved plastic injection machine which enable and accurately predetermined amount of plastic material components to be discharged together.

The present invention visualizes a plastics injection machine having a plurality of piston pumps for feeding respective plastic material components, valve means associated with said piston pumps for regulating the output of said piston pumps, the valve means being operable only in response to the pressure of said components, and common drive means for operating said piston pumps, whereby for each working stroke of the drive means predetermined amounts of the said components are discharged from the machine and the discharge is terminated by closing of the valves.

Further objects, features and advantages of the present invention will appear from the following description thereof, which is given by way of example, and not limitation, in conjunction with the accompanying drawings, wherein:

FIG. 3 shows a view, partly broken away in section, of mixer inlet valves;

FIG. 4 shows a longitudinal section, partly broken away, through a supply pump with adjustable check valves;

Figure 1:
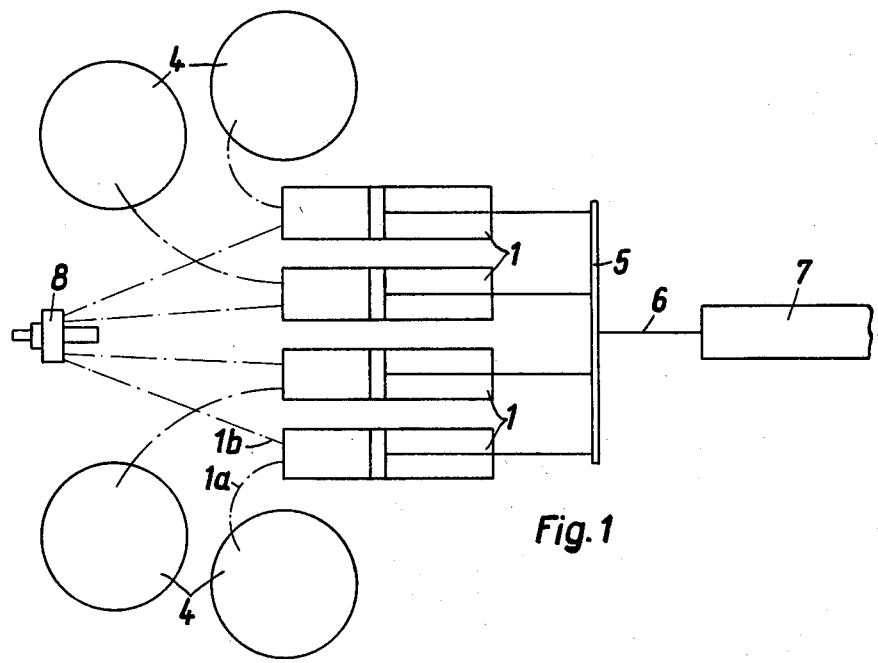
FIG. 1 shows a diagrammatic illustration of a plastic injection machine.
Figure 2:
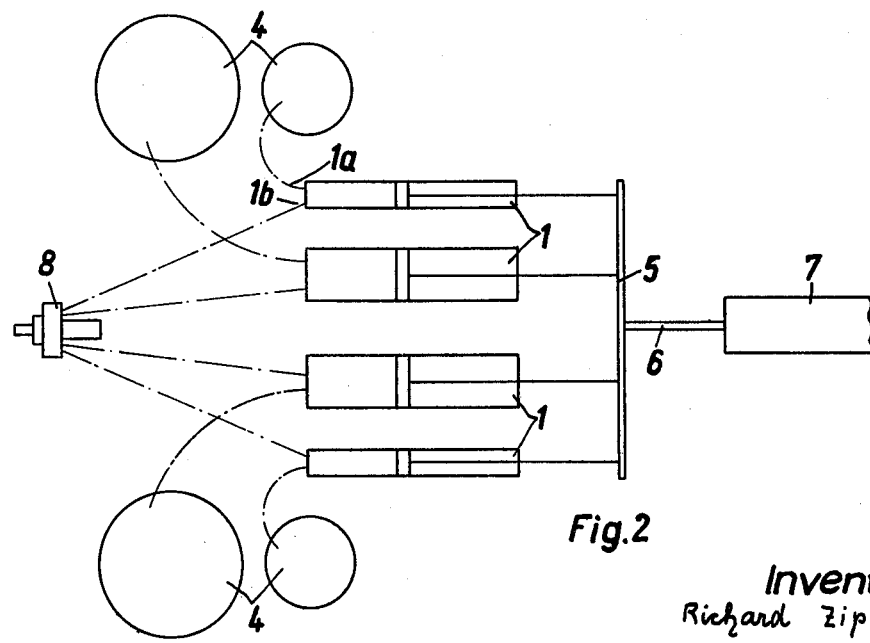
FIG. 2 shows a diagrammatic illustration of a further plastic injection machine.

FIG. 5 schematically illustrates a modification of the coupling of the pump cylinders of a machine similar to those of FIGS. 1 and 2 to a common drive which enables stepless variation of the strokes of the pumps;

FIG. 6 shows in greater detail parts of the coupling of FIG. 5;

FIG. 7 shows an embodiment of the invention and more specifically a side view of a coupling of the hydraulic drive with the piston pumps which enables alteration of the strokes of the pumps relative to one another;

FIG. 8 shows a plan view of the coupling shown in FIG. 7;

FIG. 9 shows a front view of the coupling shown in FIG 7; and

FIG. 10 shows a further modification of the drive coupling which enables partial discharge of the contents of the pumps in uniform parts.

FIGS. 1 to 6 being given for explanatory purposes.

The machines illustrated are intended for the simultaneous injection of four liquid plastic material components in metered amounts for the mass-production application of plastic material coverings to objects or filling cavities or moulds.

As shown in FIGS. 1 and 2, a piston pump 1 is provided for each of the components. The cylinders of the pumps 1 all have the same length, and the pumps 1 comprise at one end an inlet 1a and an outlet port 1b. Nonreturn valves having balls 2 and 3 (FIG. 4) are provided in the ports 1a and 1b. The inlet ports 1a are connected to pressure tanks 4, each to one, for the plastic material component to be discharged by the corresponding pump 1.

The pumps 1 are arranged parallel and adjacent to one another so that the ends of the pumps are located in a common plane. Piston rods, which project at only one end of the pumps 1, are connected together by a bar 5. A piston rod 6 of a hydraulic cylinder 7 is connected to the bar 5. The hydraulic cylinder 7 may be replaced by a pneumatic cylinder. By movement of the piston rod 6, the pistons of the pumps 1 can be displaced simultaneously and by equal amounts. The stroke of hydraulic cylinder 7 is exactly the same as the stroke of the piston pumps, and normally complete filling and emptying of the pumps 1 takes place. If the components are to be injected in equal amounts, then pumps of equal size are employed, as shown in FIG. 1. For unequal amounts of the components injecting, pumps of different cross-sectional area are provided, the cross-sectional areas having the same ratio to one another as the amounts of the components which are to be supplied. This arrangement is illustrated in FIG. 2. In this case, by equal strokes in the pump cylinders the components of the plastics material which are drawn in and discharged always theoretically have the same ratio to one another as is required for the formation of plastics material forms.

From each outlet port 1b of the pumps 1 a duct extends to a mixing chamber 8 where the different plastic material components are mixed together. The inlet ports in the mixing chamber 8 for the plastic material components preferably extend radially and are disposed in pairs diametrically opposite one another as shown in FIG. 3. In each inlet port there is provided a nonreturn valve. In the mixing chamber 8 there is provided a stirring mechanism 10 driven by a compressed air motor 11 fixedly connected with the mixing chamber 8. An outlet port 12 is disposed in alignment with the axis of rotation of the stirring mechanism 11. No valve is provided in the outlet port 12 and the mixture of different components can thus flow freely from the mixing chamber 8 and, for example, through a hose, into the cavity or the mould which is required to be filled with foam material.

The pumps 1, the hydraulic cylinder 7 and the various ducts are so dimensioned that with a single driving stroke of the hydraulic cylinder 6 just that amount of the components is fed which is required for forming the coating on an object or for forming sufficient foam material to just fill the cavity or mould. In the embodiment shown in FIG. 2, by the ratio of the cross-sections of the pumps, corresponding to the required proportions of the components in the mixture, the liquids supplied to the mixing chamber 8 are automatically metered to provide the desired mixture. If required, the amounts supplied by the pumps can be varied by altering the stroke of the hydraulic cylinder 7 as described below.

The hydraulic cylinder 7, the valves of the pumps 1 and of the mixing chamber 8, and the ducts for the components are arranged so that the discharge of the plastic material components from the pumps 1 into the hollow spaces or moulds is carried out within only the very short time elapsing between the bringing together of the components and the beginning of the foaming. This time period depends upon the components employed for forming the foam material, and in the case of polyurethene, for example, amounts to approximately 15 seconds.

In order to be able safely to carry out the supply of the components in this short period during the mass-production filling of cavities such as hollow spaces in doors and walls of refrigerators with foam material, the liquids are held in supply containers 4 under a high compressed air pressure of, for example, 3–6 atmospheres. This pressure must be sufficient to ensure that, even if the components have different viscosities, the pumps 1 are filled accurately in accordance with the movements of the pistons in the pumps 1 during the suction stroke even at high piston speeds. The valves in the inlet and outlet ports 1a and 1b of the pumps 1 must be such that they cannot be incorrectly opened by the pressure of the liquids in the pressure tanks 4. In particular, it must be ensured that the liquid, flowing under pressure into the pumps 1, does not open the outlet valves of the pumps 1 as soon as it flows into the pumps 1.

It has been found that the use of valves having the same opening pressure and throughput capacity in the outlet ports of the pumps 1 and the inlet ports of the mixing chamber 8, when components of different viscosities are used, leads to feeding of one of the components before or after the other. Thus, one of the components enters the mixing chamber 8 with a delay relative to the others, or the flow of one of the components is closed off earlier than that of the others so that the mixture ratio is affected. For this reason, valves are employed, at least in the outlet ports 1b of the pumps and in the inlet ports 8a of the mixing chamber 8, which allow the required opening and closing pressures and if necessary also the valve throughput capacities to be adjusted within large limits during the operation of the machine. Two examples of check valves of this kind are illustrated in FIGS. 3 and 4, one being intended for the chamber 8 and the other for the pump 1.

As shown in FIG. 4, in each of the pumps 1 there is provided an inlet valve member in form of a ball 2 which is urged against a valve seat by a spring 2a. The inlet port 1a extends parallel to the pump axis and coaxial with an inlet valve chamber. The spring 2a is provided in the valve chamber between an inlet opening 1c in the pump cylinder and the end of the inlet port 1a screwed into the valve chamber, the seat for the ball 2 being formed at this end of the inlet port 1a. The force of the spring 2a is not adjustable.

An outlet opening 1d in the pump cylinder is formed as the valve seat for the ball 3. A spring 3a acting at one end on the ball 3 is seated at its opposite end against a spring retainer 14 which is adjustable in the direction of the spring axis by means of a threaded member 15, which is in threaded engagement in a cup-shaped valve housing member 16b which forms a part of the valve chamber. By rotation of the threaded member 15, the force of the spring 3a can be very finely adjusted. In this way it is possible to adjust the outlet valves of all of the pumps 1 in accordance with the viscosities of the plastic material components so that all these valves open simultaneously and by the same amount shortly after the beginning of the working stroke of the hydraulic cylinder 7 and close again at the end of the working stroke.

Because of this arrangement for adjusting the spring 3a, the outlet port 1b has to be arranged perpendicular to or inclined to the axis of the pump cylinder.

In the inlet valve of each of the pumps 1 there is provided a pressure relief channel 16, with a closure belt 16a, for allowing air to be discharged from the pumps before the pumps are put into operation.

The inlet valves of the mixing chamber 8, illustrated in FIG. 3, are provided at inlet channels having bores of equal diameters arranged radially of the axis of the stirring mechanism 10, the inlet valves not only allowing alteration of the force of the springs thereof but also of the size of the valve opening through which the plastic material components flow. The sizes of the valve openings need to be adjusted since the bore of each inlet channel in the mixing chamber 8 is of the same size while the amounts of the components feed through the channels are usually different, depending on the mixing ratio. In the construction shown in FIG. 3, a valve pin 17 extending perpendicular to the axis of the stirring mechanism 10 is used as the movable valve member instead of a ball. This pin 17 is formed at its end nearest the axis of the stirring mechanism 10 with a conical tip cone and at its other end is secured to a diaphragm 18. The periphery of the diaphragm 18 is fixedly clamped in a recess in the boring of the port 8a by the edge of a sleeve 19, which is in threaded engagement in the port 8a. The pin 17 is guided by one end of a tube 20 extending partly into a boring (not shown) which is formed in the pin 17 at the end opposite the conical tip and extending over only a part of the length of the pin 17. The other end of the tube 20 is widened and is in threaded engagement in the end of the sleeve 19 remote from the diaphragm 18. A spring 21 is seated at one of its ends against the pin 17 and at its other end against the widened end of the tube 20. The spring 21 thus urges the pin 17 towards the valve seat. The end of the tube 20 projecting beyond the sleeve 19 is integral with a cap 22 which extends around the sleeve 19 over a major part of its length. This cap 22 serves as a handle for screwing the tube 20 into the sleeve 19 and thus for altering the force of the spring 21. By means of a screw 23 extending through the wall of the cap 22, the cap 22 can be secured in any position to which it is rotated. The plastic material component flows from one side into the space between the diaphragm 18 and the valve seat. The component, under pressure, loads the diaphragm so as to tend to lift the valve pin 17. The spring 21 is normally so adjusted that a pressure of 3 atmospheres must act on to the diaphragm 18 to press it back and unseat the valve pin 17 and thereby to allow the component to flow under pressure into the mixing chamber 8. By adjustment of the pin 17 by means of the cap 22, the force of the spring 21 and thus the pressure at which the valve opens can be varied. The extent to which the diaphragm 18 is deflected and the valve pin 17 is displaced depends on the difference between the pressure of the plastic material component and the opening pressure of the valve, which is controlled by the spring 21. The conical tip of the valve pin 17 is more tapered than the valve seat so that during the comparatively slow axial displacement of the valve pin there is a considerable alteration of the size of the valve opening.

It often happens in operations such as the coating of objects with plastic material, or the filling of cavities with foam material, that objects of different sizes have to be covered with coatings of different thicknesses or cavities of different sizes have to be filled in succession. Since the objects or cavities may differ from one another in size by only small amounts, the operation of the machine requires a large number of pumps of different sizes from which the size required for any particular purpose can be selected. In this connection, a substantial simplification and reduction of storage can be obtained if during an operating stroke of the hydraulic cylinder 7 the pump cylinders do not have to be fully filled. A partial filling of the pump cylinders, which is however completely discharged, can be achieved if either the stroke of the hydraulic cylinder 7 is variable or a coupling is provided between the hydraulic cylinder 7 and the bar 5 connecting the piston rods of the pumps which causes the bar 5 to remain stationary until some time after the beginning of the working stroke of the hydraulic cylinder 7 by which liquid is sucked into the pumps. The pump pistons 1 can of course also be moved with a delay during the return stroke of the cylinder 7.

The stroke of the hydraulic cylinder 7 can be made variable by altering the point of return of the piston movement of the hydraulic cylinder 7. For this purpose, an electric control device is provided for slide valve (not shown) controlling the hydraulic cylinder 7. The provision of such an electrical control device is illustrated in FIGS. 5 and 6. As shown in these figures, the piston rods of all pumps 1 are fixedly secured to the bar 5, the middle of which is secured to the piston rod 6 of the hydraulic cylinder 7. A rail 23 is secured on the bar 5 in alignment with the piston rod 6 and carries two slide members 24 and 25 which can be adjusted along a scale on the rail 23. These slide members 24 and 25 project at one side towards a fixed contact support 26 the ends of which are bent towards the rail 23, one of the ends forming an abutment 26a for the slide member 24 and the other end forming an abutment 26b for the slide member 25. The parts 24 and 26a, on the one hand, and the parts 25 and 26b, on the other hand, are connected in an electric circuit which is closed when one of these pairs of parts contact one another. Each circuit is connected to the slide valve for the reversing the direction of movement of the piston of the hydraulic cylinder 7.

While for various multi-component materials the mix ratio in which the components are to be with one another is generally known, it nevertheless often happens that during the operation of the machine alterations in the mixture ratio are desirable within small limits. Thus, for example, at warm temperatures somewhat less hardening component is required than at cooler temperatures. The variations in the mixture ratio are often so small that replacement of the pumps 1 by similar pumps of different cross-sectional area would not be economical.

In an embodiment of the invention, illustrated in FIGS. 7 to 9, the machine is constructed so that while the stroke of the hydraulic cylinder 7 remains constant, the length of the stroke of each pump 1 can be altered. The adjustment of the stroke of one or more of the pumps 1 should be effected so that the amount of liquid drawn into each pump is also fully discharged again.

As shown in FIGS. 7 to 9, the cylinders of the pumps 1, which at their ends contain the inlet ports 1a and the outlet ports 1b, are pivotably connected by bands 27 and bolts 28 to an inclined frame 29, which is fixed in position and forms part of a fixed frame structure. The piston rods of the pumps 1 have fork-shaped ends pivotably connected to another frame 30 by respective connecting members 33, the frame 30 initially extending parallel to the frame 29 and being pivotable at its lower edge about horizontal pivots 31 which extend perpendicular to the direction of the piston rods of the pumps 1. The pivotation of the frame 30 is effected by the hydraulic cylinder 7, which is pivotably connected at one end to the upper edge of the frame 29, the piston rod 6 being pivotably connected to the upper end of the pivotable frame 30. The parts 32 shown in FIGS. 7 and 8 are pumps for the hydraulic drive 7.

The bolts 28 are adjustable in upwardly extending guide slots in the frame 29, and the connecting members 33 are adjustable in corresponding guide slots in the pivotable frame 30. In this way it is possible to adjust each pump 1 to a different spacing from the pivots 31 of the frame 30. The spacing of the pumps 1 from the pivots 31 determines the magnitude of the strokes of the pumps 1 and thus of the amounts of liquid sucked in by these pumps. Even when using pumps of completely equal sizes, with constant stroke of the hydraulic cylinder 7, a different amount of filling can thus be obtained depending on the spacing of the pump from the pivots 31.

The amount by which the strokes of the pumps 1 can be adjusted relative to one another is considerable. Consequently, with this construction by adjustment of the pumps 1 relative to the frames 29 and 30 and the pivots 31, not only can small alterations be made in the mixing ratio, but also the mixing ratio can be varied within large limits even with pumps 1 of the same sizes. The range over which the mixing ratio can be adjusted may be made even greater by using pumps of different cross-sectional area and the same length.

In cases where very large numbers of small objects are to be successively covered with comparatively thin coatings of multiple-component plastic material, it may in some circumstances be advantageous to discharge the contents of pumps 1 of comparatively large capacity in portions by small movements of the pistons.

In the embodiment illustrated in FIG. 10 a free-wheel device is interconnected between the piston rod 6 of the hydraulic cylinder 7 and the pivotable frame 30 connecting the pistons of the pumps 1 and is constructed so that only on movement of the piston rod 6 towards the pumps 1 is there a fixed connection between the piston rod 6 and the pivotable frame 30 while during movement of the piston rod 6 from the pumps the piston rod 6 can move freely. In the embodiment illustrated, the free-wheel device is formed by a rack 35 connected to the pivotable frame 30, and by a pawl 36 engageable with the rack 35 and mounted on the piston rod 6. The rack 35 slides in a guide 37. The hydraulic cylinder 7 is arranged so that its stroke can be equal to the length of the pumps 1, but can be varied over a wide range and can be adjusted so that it corresponds to a single one of, or only a few of, the teeth of the rack 35. Preferably, the end of the rack 35' nearest the hydraulic cylinder 7 has a projection 35' extending around the piston rod 6. The pawl 36 eventually abuts against this projection 35'. The pawl 36 and the rack 35 are constructed so that the pawl 36 is held in engagement with the toothing of the rack during the working stroke of the piston rod 6, whereas on the return stroke of the piston rod 6 the pawl 36 strikes the projection 35' and moves the rack back into its initial position. The slide valve (not shown) controlling the hydraulic cylinder 7 is simultaneously operated so that the piston of the hydraulic cylinder 7 carries out a complete stroke and the pistons of the pumps 1 are returned to their outermost positions. The pumps 1 are thus completely refilled.

While reference has been made above to the use of foam plastic material, it will be readily understood by those skilled in the art that other, non-foam materials such as polyurethane elastomers, epoxy resins and polyesters may be mixed and injected by machines according to the present invention.

I claim:

1. A plastic injection machine comprising a plurality of piston pumps for feeding plastic material components, non-return valve means associated with said piston pumps for controlling the discharge of said components from said piston pumps in dependence on the pressure of said components in said piston pumps, each piston pump having a cylinder and a piston reciprocatable therein, the piston having a piston rod, the cylinder of said piston pumps being of substantially equal lengths, common drive means for operating said piston pumps simultaneously, said common drive means having a further cylinder and a further piston reciprocatable therein, said further piston having a further piston rod, and means for supporting said piston pumps and said common drive means said supporting means comprising a base, a first support and a second support, one of said supports being fixed to said base and the other support being pivotally connected to said base, each support having a plurality of parallel guide tracks extending in the directions from the base towards the end of the support remote from the base, a plurality of first connecting means pivotally connecting the ends remote from the said piston rods of said cylinders to said first support, and a plurality of second connecting means pivotally connecting the ends of said piston rods remote from said pistons to said second support, each of said first connecting means being adjustable in position along one of said guide tracks of said first support, and each of said second connecting means being adjustable in position along one of said guide tracks of said second support, said common drive means being pivotally connected to and between said first and second supports being adapted to pivot said pivotally connected support for operating said piston pumps simultaneously, the strokes of said piston pumps being variable by adjusting the position of said first and second connecting means along said guide tracks, said piston pumps and said common drive means being completely accommodated between said first and second supports.

2. A plastic injection machine as defined in claim 1, wherein the transverse internal area of at least one of said cylinders of said piston pumps differs from the transverse internal area of at least another one of said cylinders of said piston pumps.

References Cited

UNITED STATES PATENTS

| | | | |
|---|---|---|---|
| 1,036,587 | 12/1912 | Doyle et al. | 103—47 |
| 1,072,718 | 9/1913 | Heindl | 103—47 |
| 1,274,884 | 8/1918 | Hudson | 103—166 |
| 1,817,052 | 8/1931 | Wood | 103—38 |
| 2,752,989 | 7/1956 | Jenkins | 103—38 |
| 2,910,875 | 11/1959 | Kuhnhausen | 103—159 |
| 2,925,780 | 2/1960 | Tear | 103—38 |
| 3,272,133 | 9/1966 | Vignerot | 103—38 |

WILLIAM L. FREEH, Primary Examiner

U.S. Cl. X.R.

18—30; 103—47